US012436956B2

United States Patent
Perinchery et al.

(10) Patent No.: US 12,436,956 B2
(45) Date of Patent: Oct. 7, 2025

(54) AUTOMATED ENHANCEMENT OF METADATA IN MEDIA PROGRAM DATABASE USING EMBEDDED VECTORS

(71) Applicant: DISH Network Technologies India Private Limited, Karnataka (IN)

(72) Inventors: Melvin Perinchery, Bengaluru (IN); Shanmugam Ramaswamy, Bengaluru (IN)

(73) Assignee: DISH Network Technologies India Private Limited (IN)

( * ) Notice: Subject to any disclaimer, the term of this patent is extended or adjusted under 35 U.S.C. 154(b) by 0 days.

(21) Appl. No.: 18/584,649

(22) Filed: Feb. 22, 2024

(65) Prior Publication Data

US 2025/0173343 A1 May 29, 2025

(30) Foreign Application Priority Data

Nov. 28, 2023 (IN) .............................. 202341080764

(51) Int. Cl.
*G06F 16/2457* (2019.01)
*G06F 16/22* (2019.01)
*G06F 16/2452* (2019.01)
*G06F 16/732* (2019.01)
*G06F 16/783* (2019.01)

(52) U.S. Cl.
CPC .... *G06F 16/24573* (2019.01); *G06F 16/2237* (2019.01); *G06F 16/24522* (2019.01); *G06F 16/7343* (2019.01); *G06F 16/783* (2019.01)

(58) Field of Classification Search
None
See application file for complete search history.

(56) References Cited

U.S. PATENT DOCUMENTS

| 8,285,727 | B2 * | 10/2012 | Weber ................. H04L 12/2805 725/53 |
| 9,003,472 | B2 * | 4/2015 | Andersson ......... H04N 21/4788 725/86 |
| 12,287,815 | B2 * | 4/2025 | Ratner ................... G06F 16/316 |
| 2004/0177063 | A1 * | 9/2004 | Weber ..................... G06F 16/41 |
| 2012/0151529 | A1 * | 6/2012 | Andersson ......... H04N 21/4788 725/44 |
| 2016/0078079 | A1 * | 3/2016 | Hu .......................... G06F 16/20 707/803 |
| 2025/0023930 | A1 * | 1/2025 | Shin ...................... H04L 65/402 |

(Continued)

OTHER PUBLICATIONS

Timestamp Snooping (Year: 2000).*
Estimating Embedding Vectors for Queries (Year: 2016).*

*Primary Examiner* — Kim T Nguyen
(74) *Attorney, Agent, or Firm* — KW Law, LLP (57) ABSTRACT

Systems, devices and automated processes are described for automated enhancement of metadata in a database of information about movies, television shows or other media programs. Gaps or errors in metadata describing the different programs in the database can be corrected using a digital architecture in which one or more sources are queried for missing information. Queries may be directed toward a large language model (LLM) or other artificial intelligence (AI) engine, if desired, that represents information about the media programs as embedded vectors that can be compared to query data to identify additional information about the media programs.

15 Claims, 4 Drawing Sheets

(56) References Cited

U.S. PATENT DOCUMENTS

| | | | |
|---|---|---|---|
| 2025/0077773 A1* | 3/2025 | Arumugam | G06F 16/248 |
| 2025/0086170 A1* | 3/2025 | Rumade | G06F 16/243 |
| 2025/0138986 A1* | 5/2025 | Bazzo | G06F 11/362 |
| 2025/0139140 A1* | 5/2025 | Gopalan | G06F 16/3329 |
| 2025/0156413 A1* | 5/2025 | Barkan | G06F 40/295 |
| 2025/0156419 A1* | 5/2025 | Shah | G06F 16/254 |
| 2025/0173343 A1* | 5/2025 | Perinchery | G06F 16/24573 |
| 2025/0173375 A1* | 5/2025 | Perinchery | G06F 16/7343 |
| 2025/0175675 A1* | 5/2025 | Gopinath | H04N 21/4667 |

\* cited by examiner

AUTOMATED ENHANCEMENT OF METADATA IN MEDIA PROGRAM DATABASE USING EMBEDDED VECTORS

PRIORITY CLAIM

This application claims priority to India Provisional Patent Application Serial No. 202341080764 filed on Nov. 28, 2023, which is incorporated herein by reference. A Foreign Filing License No. POC/FA4980CHE2023/2023-5127 has been obtained from the India Patent Office, and WIPO has issued DAS code F67D for the provisional filing.

TECHNICAL FIELD

The following generally relates to automated enhancement of database records relating to movies, television programs and other audio/visual media content. More particularly, the following relates to systems, devices and automated processes to enhance metadata regarding media programs that is stored in a database. Some implementations may make use of artificial intelligence (AI) constructs, as described herein, such as a large language model (LLM) that makes use of embedded vectors.

BACKGROUND

Electronic Program Guides (EPGs) are an important part of modern media viewing. Typically, the EPG provides a digital menu system that provides users with continuously updated menus displaying available programming as well as scheduling information for current and upcoming programming. EPGs are an important part of modern digital broadcasting services, including satellite, cable TV, and over-the-top (OTT) streaming platforms. Other media delivery services often provide EPG-type databases related to the content available from that service.

More recently, viewers have come to expect a wealth of data about the programs that they are considering. Modern EPGs provide not only title and schedule information, but also information about the program such as identification of actors and actresses, directors, producers and other people involved in creating the program. Some guides additionally provide other information such as release date, any awards that the program may have been nominated for or won, brief summary of the plot of the program, and/or any other information of interest to the viewers. This information may be available for browsing, searching, or other functions as desired.

Usually, EPG data is maintained in an electronic database that includes records for each program available. Creating and updating records for all of the programs in the database can be a substantial chore. Program data is available from several commercial databases, but each of these services has limitations in terms of formatting, data availability, limited information available for each program, and so forth. Creating a database of consistent and complete data often requires a substantial amount of manual research and data entry, which can be expensive, cumbersome and prone to human error.

A substantial desire therefore exists to build systems, devices and automated processes that allow for automated creation and updating of database records relating to programs available from a media delivery service. These and other features are described in increasing detail below.

BRIEF DESCRIPTION

Systems, devices and automated processes are described to automatically create and/or update database records associated with an electronic program guide or other database of media programs. The system suitably includes a mapping service that initially populates database records or other metadata with information from a primary service, and that uses an artificial intelligence (AI) engine to identify additional information that is missing from the primary record, and to automatically obtain the missing information using natural language queries or the like. The AI engine may also be used to validate the database records, thereby identifying any errors or discrepancies in the information received from the primary source.

In one example embodiment, an automated process is performed by a computer system that comprises a processor, a non-transitory digital storage and an interface to a network. The automated process suitably comprises: identifying one or more missing data fields in metadata about a media program that is stored in a database; automatically formatting a query related to the one or more missing data fields to obtain additional information about the media program from an artificial intelligence (AI) engine, wherein the AI engine comprises embedded vectors representing data previously obtained about the media program; in response to the query, identifying additional information corresponding to the one or more missing data fields the query based upon the embedded vectors; updating the missing data fields in the metadata about the media program with the additional information from the AI engine; and storing the updated metadata about the media program in the database for subsequent retrieval.

In another example, a computer system comprises one or more processors, non-transitory digital storage and an interface to a network, wherein the non-transitory digital storage comprises computer-executable instructions stored thereon that, when executed by the one or more processors, performs an automated process to obtain additional information for a database of program information from an AI engine executed locally by the computer system. In one example, the automated process suitably comprises: identifying one or more missing data fields in metadata about a media program that is stored in a database; automatically formatting a query related to the one or more missing data fields to obtain additional information about the media program from an artificial intelligence (AI) engine, wherein the AI engine comprises embedded vectors representing data previously obtained about the media program; in response to the query, identifying additional information corresponding to the one or more missing data fields the query based upon the embedded vectors; updating the missing data fields in the metadata about the media program with the additional information from the AI engine; and storing the updated metadata about the media program in the database for subsequent retrieval.

Additional embodiments provide other systems, devices, computing systems and automated processes substantially as described herein, and/or their legal equivalents.

DETAILED DESCRIPTION

The following detailed description is intended to provide several examples that will illustrate the broader concepts that are set forth herein, but it is not intended to limit the invention or the application and uses of the invention. Furthermore, there is no intention to be bound by any theory presented in the preceding background or the following detailed description.

Systems, devices and automated processes are described for automated enhancement of metadata in a database of information about movies, television shows or other media programs. Gaps or errors in metadata describing the different programs in the database can be corrected using a digital architecture in which one or more sources are queried for missing information.

Queries for metadata information may be directed toward a large language model (LLM) or other artificial intelligence (AI) engine, if desired. The AI engine could be used to populate new data in a currently-existing database and/or to fill in gaps in the database by querying for additional information as appropriate. The AI could also be used to verify information already present in the database by checking against another data source. In some implementations, the information obtained and stored in the database can be used to generate new vectors that can be embedded in the database or elsewhere to improve future queries. Similar features could be built and used in any number of equivalent embodiments.

Figure 1:
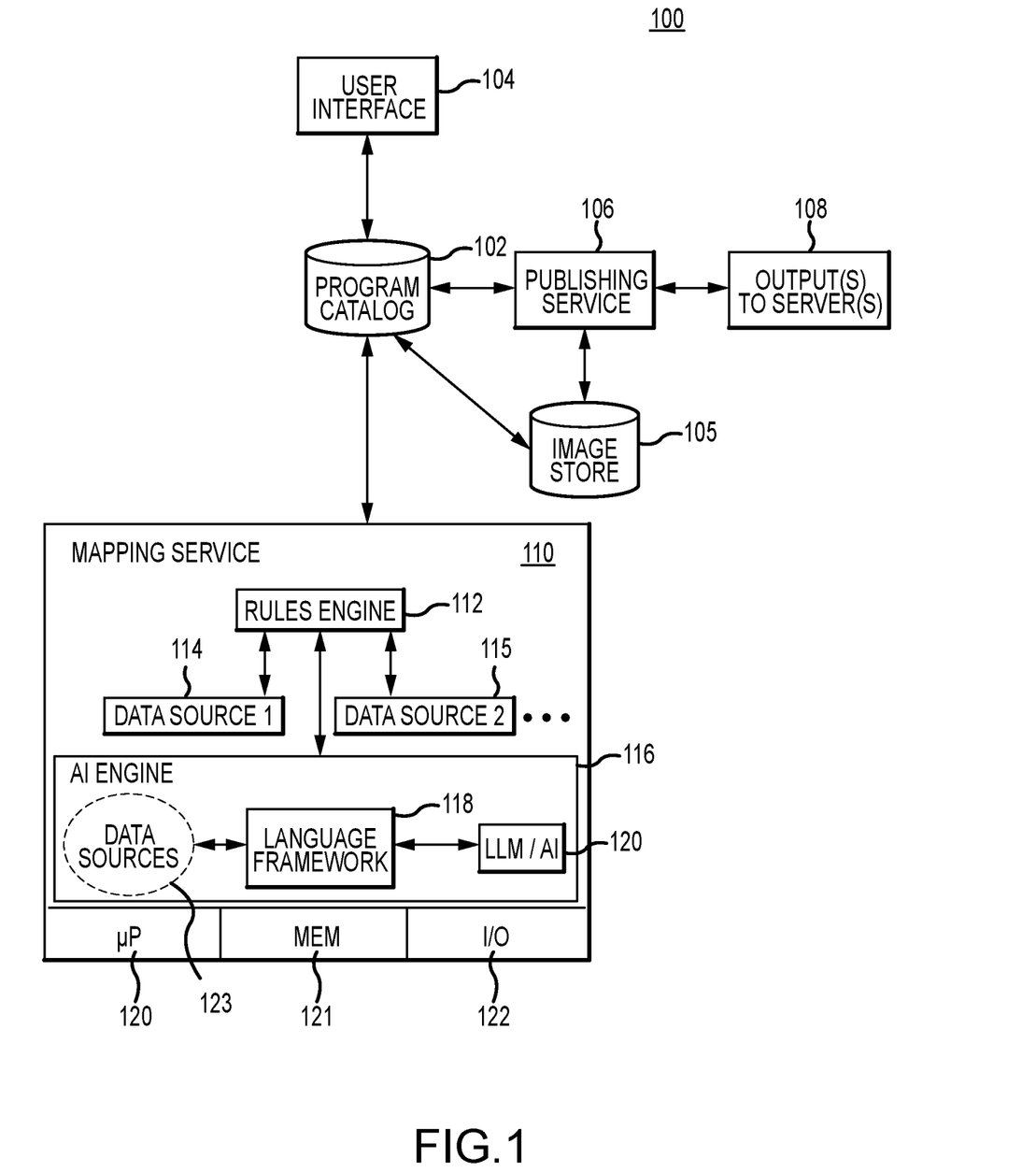
FIG. 1 illustrates an example system for automated updating of metadata relating to media programs.

With reference now to FIG. 1, a new computing architecture 100 is provided to maintain and/or enrich the metadata in a database 102 of program information that feeds an electronic program guide (EPG) or similar service(s) 108. Metadata describing the various records in the database 102 is filled and/or updated using a mapping service 110 that operates in response to a rules engine 112 or other control logic. In various embodiments, database records are initially populated based upon information available from one or more data sources 114, 115, with that information being updated or supplemented using an AI engine 116, if desired. AI engine 116 suitably makes use of a large language model (LLM) or the like. Natural language queries can be posited to a local or remote AI engine 120, and/or transmitted via the Internet or another digital network to additional data sources 122, as appropriate, and as described more fully below. Additional data sources could include publicly available sources (e.g., Wikipedia), as well as any information available to the AI engine, as desired. AI engine 116 may also perform validation of information received from data sources 114, 115 if desired, and/or may perform format conversion or correction of metadata as appropriate.

Examples of primary data sources 114, 115 could include, without limitation, services such as the GRACENOTE media database service available from Gracenote, Inc. of Emeryville, California or the IMDB service maintained by Amazon Inc. of Seattle, Washington, although additional and/or alternate services could be equivalently used. In some embodiments, the metadata associated with a particular program is initially populated with information obtained from one of the data sources 114, 115, as appropriate, using APIs or other interfaces provided by the service. Generally, these sources 114, 115 provide information associated with particular media programs in a known format, such as an XML schema having known headings and data fields. If database 102 operates with a different format or schema than that provided by the data sources 114, 115, then rules engine 112 may perform format conversion as needed.

AI engine 116 may be implemented in any manner. In the example of FIG. 1, AI engine 116 suitably includes an interface 122 to one or more sources of data and a natural language framework 118 for formatting natural language queries to an AI engine 120. AI engine 120 may be implemented as a local engine, if desired, executing within system 116. In other implementations, queries generated by natural language framework 118 could be posited to an external engine 120 available via the Internet or another data network.

In one example, AI engine 120 is implemented with LLAMA, LocalGPT or another AI engine executed by processor 120, as appropriate. The local AI engine 120 is appropriately trained using data about media programs corresponding to the records in database 102. Data can be ingested using interface 122, if desired, from any available sources, including data sources 114, 115 or the like. Data can also be ingested from actual program content, if desired. Timed text or other metadata associated with the program itself could be used to train AI 120, as appropriate. Other embodiments could analyze video and/or audio contents of the program to identify scene breaks, actors and actresses, or other information about the program as desired.

Data received about the media programs can be used to train the AI engine 120 in any manner. In various embodiments, the AI engine converts received data to mathematical vectors that can be stored for subsequent analysis, as described more fully below. The AI engine is therefore able to supply missing elements of database records corresponding to media programs for storage in database 102.

Information in database 102 may be retrieved for any purpose. In the example of FIG. 1, a publishing service 106 extracts database information from the program database 102, along with any still or moving images, for publication or other delivery to an EPG service, a video on demand (VOD) service, a remote or local storage digital video recorder (DVR) service, and/or another other services 108 as desired. Publication service 106 could use the interface 104 to access databases 102 and 105, if desired. Alternately, a subscription service (e.g., the KAFKA event stream service provided by the Apache Software Foundation) could be used to provide a data feed from the database to the publication service 106, as desired.

If desired, an appropriate user interface 104 is provided to allow human operators to make manual edits and/or to view information, if desired. Interface 104 may be implemented using an application program interface (API) and/or web interface, for example. In either case, the administrator can connect to the interface, provide appropriate authentication credentials, and obtain access to database 102 for record creation, read, update and/or delete (CRUD) functions, as appropriate.

In an example embodiment, database 102 is implemented using a database management system (DBMS) that is compatible with structured query language (SQL) or similar protocols to permit authorized administrators to perform CRUD functions or the like using the provided interface 104. Still and/or moving images associated with the various program records may be stored in a separate image database 105, if desired, or image data can be combined with the primary program database 102 in other implementations. Generally, the database schema or other metadata stored in the primary program database 102 will include links (e.g., uniform resource locators (URLs)) or other references to the images associated with the program, thereby permitting for convenient retrieval of the images from the image database 105.

The various components of system 100 are implemented using digital hardware, software and/or firmware logic executed by one or more data processors. In the example of FIG. 1, for example, mapping service 110 is shown executing on a conventional computer system that includes hardware such as a processor 120, non-transitory digital storage 121 (e.g., magnetic, optical and/or solid state memory), and any appropriate interfaces 122 for network access and other input/output functions. The other components of system 100 are similarly implemented using computing hardware and digital programming. In some implementations, the physical hardware used to implement one or more components of system 100 may be abstracted and implemented using so-called "cloud" resources, such as the Amazon Web Services (AWS) system provided by Amazon Inc. Other embodiments could equivalently use cloud services provided by IBM, Inc., Microsoft Corporation, Google, Salesforce and/or other service providers if desired.

Figure 2:
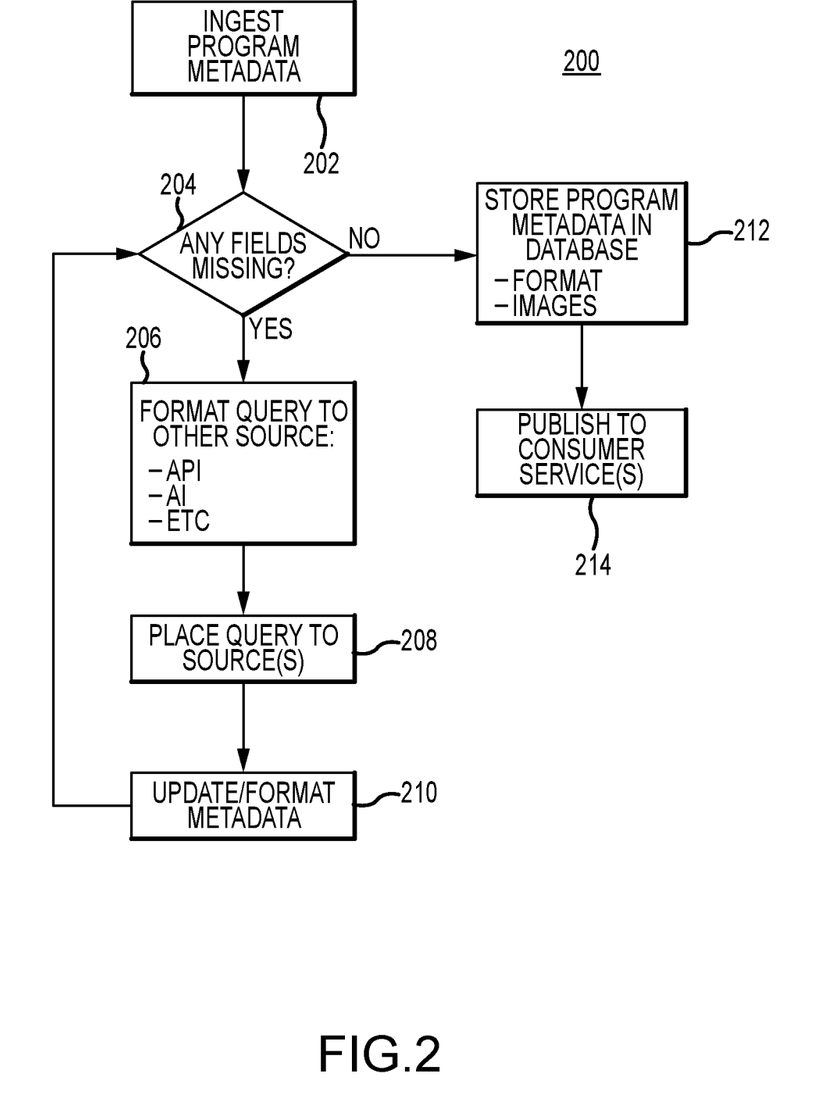
FIG. 2 illustrates an example of an automated process to automatically update metadata relating to media programs.

Turning now to FIG. 2, an example of an automated process 200 is performed by system 100 to create and update metadata relating to a database record associated with a media program. The various functions illustrated in the example of FIG. 2 may be carried out by any sort of hardware, software and/or firmware logic residing within system 100, and various embodiments may organize the various functions shown in FIG. 2 in any other manner.

Metadata for a new program to be added to the database is initially ingested in any manner (function 202). In various embodiments, metadata is initially received from a subscription-based or other data source 114, 115 such as the META-CLOUD or IMDB databases referenced a above. Metadata may be obtained by interacting with an API or other interface provided by the service. In various implementations, programs are identified by a published identifier that can be submitted to the data source 114, 115 to obtain additional information about the identified program. Other implementations may rely upon the title or owner of the program, or other identifying information as appropriate.

Generally, data sources 114, 115 will deliver requested metadata in a predetermined format, such as an XML or JSON schema or the like. If database 102 may be organized to use the same schema in some embodiments, but more typically database 102 will prefer a more complete schema that is capable of storing additional data about the various programs than a single data source 114, 115 will deliver. To that end, rules engine 112 or the like will typically convert the metadata received from the data source 114, 115 to the desired format, adding additional data fields and converting syntax as appropriate. The converted data can be stored in database 102 for subsequent retrieval (function 212). Note that even if the metadata for the record is incomplete, the available data could be stored in the database for use until the more complete information is obtained, if desired.

Frequently, the metadata record about the program will have one or more gaps corresponding to missing information that is not available from the primary program source 114, 115 (function 204). In such cases, system 100 can take any number of different actions to complete the metadata record for the program. System 100 can prompt a human operator for the missing data, for example, using interface 104 or the like. This could permit the operator to search for the missing information and to add it manually, if desired. Reports of missing information could be provided in real time, if desired, or could be batched with missing information reports from other database records so that the operator could search and provide updates at a later time, if desired.

In various implementations, missing information is automatically obtained by system 100 without manual effort by a human operator to request the specific information. In the example of FIG. 2, rules engine 112 or another component of system 100 appropriately formats a query that can be submitted to a secondary data source to obtain the missing information (function 206). The query may be, for example, a natural language query that can be submitted to an artificial intelligence (AI) engine, for example. Examples of AI engines that are publicly available include, without limitation, the CHATGPT engine available from OpenAI, the GOOGLE AI and TENSORFLOW services available from Google Inc, the WATSON engine available from IBM Corporation, the AZURE AI service available from Microsoft Corp., the GROK service available from X/Twitter, and/or many others. Some embodiments may make use of multiple AI engines, if desired.

In many embodiments, the AI query will be formulated as natural language. A query for award nominations associated with a particular movie, for example, could take the form of "What awards was MOVIE nominated for?". Similarly, actors and actress names could be obtained by asking "What actors and actresses appeared in MOVIE?". A language framework 118 or similar processing component of system 100 could be used to create natural language queries, if desired.

The queries may be placed via an API or public interface made available by the AI engine, if desired (function 208). Equivalently, a local version 120 of the AI engine could run locally within system 100, if desired. The LOCALGPT program, for example, allows for a locally-executing program to abstract queries placed to the OpenAI's CHATGPT service. Other AI engines, including the LLAMA engine and many others, permit similar abstraction. In still other embodiments, a customized LLM or other engine could be formulated to seek out relevant information from relevant sources 122 (e.g., Wikipedia, search engines, and/or the like). The customized AI may make use of embedded vectors as described more fully herein.

Responses to queries are appropriately received by system 100 and processed as appropriate (function 210). In the example of FIG. 2, the responses to the queries are reformatted into the schema of database 102 so that the information can be maintained and subsequently used by any number of customers. If desired, the information initially obtained from data sources 114, 115 could be spot checked using queries 206 to an AI engine or the like to verify accuracy and completeness. If desired, it may not be necessary to initially populate the program's metadata record from data sources 114, 115 if the information can be obtained entirely from queries placed to AI sources or the like.

As noted above, program metadata can be stored and maintained in database 102 for subsequent retrieval (function 212). The information may be published in any manner (function 214) (e.g., using Adobe KAFKA or the like) to any number of consumer services, such as electronic program guides for direct broadcast satellite (DBS), over-the-top (OTT) media streaming, cable and/or terrestrial broadcast television distribution systems. Equivalently, the information may be used by local and/or remote storage digital video recorders, or other media services 108 as desired.

Figure 3:
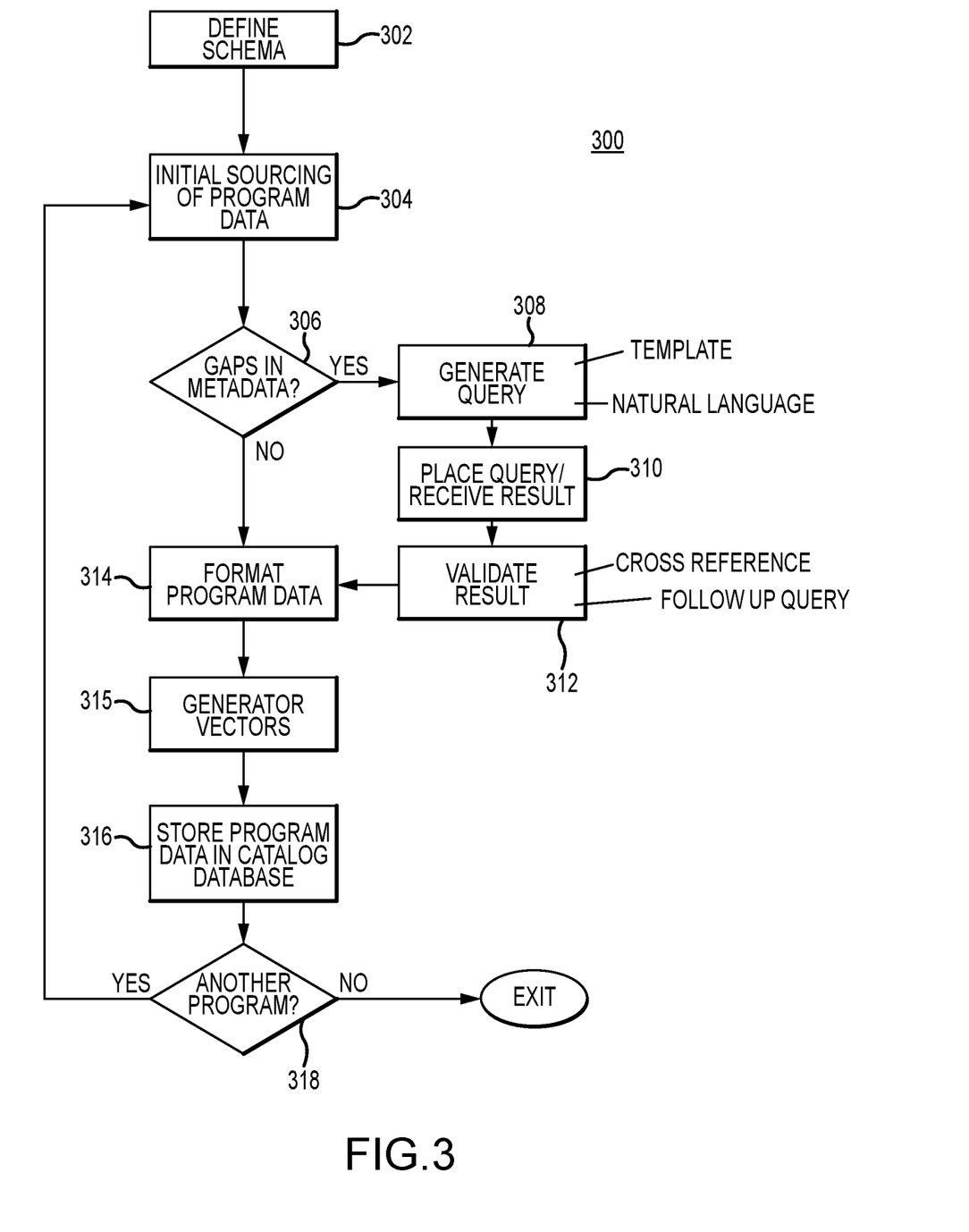
FIG. 3 illustrates an example of an automated process to automatically update metadata relating to media programs that makes use of an artificial intelligence (AI) engine.

FIG. 3 shows another example of an automated process 300 to populate metadata in a database of information about media programs that is performed by one or more components of system 100 without manual intervention by a human operator. The process shown in FIG. 3 begins with defining a schema (e.g., in XML or JSON) for each media program that will include data fields for each of the categories desired, as well as defining information about how the data is stored (function 302). The schema may contain any number of data fields, each formatted in any manner. "Actor/Actress Names", for example, may be stored within a string field of any length with commas, semicolons or other delimiting punctuation separating the multiple different entries contained within the field. As noted above, the schema may be defined in any manner. An AI (e.g., AI 120, or any remotely-accessible AI engine) may be used to define the schema, if desired.

Program metadata may be initially sourced in any manner (function 304). As noted above, data may be initially sourced from a database service 114, 115 if desired. Alternately, data may be obtained strictly from queries as set forth herein, if desired. Process 300 may also be useful in updating existing database records as information changes (e.g., a program is nominated for additional awards, or changes ownership), or if additional data fields are added to the database schema such that all of the records in database 102 need to be updated.

If one or more gaps are identified in the metadata for one or more programs (function 306), then queries can be generated to obtain the missing information from an AI or other secondary source (function 308). As noted above, queries may be natural language based, and may be based upon template language if desired. To that end, a rules engine 112 or natural language framework 112 residing within system 110 can formulate a query in a format that can be received and interpreted by the AI 120 or other secondary source 122.

Queries are placed, and results are received in any manner (function 310). As noted above, queries may be placed to a local LLM 120 or a public AI that receives the query, obtains the requisite information, and provides an appropriate response. The response will often be in a natural language format or the like. Interaction with the AI engine for queries and responses will typically take place via the API associated with the engine, using formats and protocols that are published by the service.

Responses from the AI or other secondary source can be processed as desired (function 312). In various embodiments, results can be checked against currently-held data to verify the accuracy of the information, if desired. Equivalently, queries could be placed to multiple AI engines for further verification and consistency. If discrepancies exist, logic in system 100 could create follow-up queries, if desired, to obtain clarifying information or to make the result more accurate.

Results obtained from the secondary source are formatted for storage within the predefined schema as appropriate (function 314). Often, AI engines return results in natural language format, so the raw data will typically be removed from the surrounding language for storage in the schema. A query for the cast of "Top Gun: Maverick", for example, could return a sentence such as "The main cast of the 2022 film 'Top Gun: Maverick' includes Tom Cruise, Miles Teller, Jennifer Connelly, Jon Hamm, Glen Powell, Ed Harris, Val Kilmer, Lewis Pullman, Charles Parnell, Bashir Salahuddin, Monica Barbaro, Jay Ellis, Danny Ramirez, Greg Tarzan Davis, Manny Jacinto, Raymond Lee, and Jake Picking". Such a result will typically be processed to remove the leading words and to extract the names of cast members from the surrounding text, and to otherwise place the received information into the appropriate format for records stored in database 102. Depending upon the schema, it may be necessary to replace the commas shown with semicolons or other delimiting punctuation. Other formatting may also occur, and other data fields may need different types of formatting, as appropriate. Formatting may be performed with scripting in the Python or another programming language, or in any other manner desired. AI constructs could also be used to tailor the formatting of responses received so that additional formatting after receipt is reduced or eliminated.

In various embodiments, the newly-received metadata about program can be used to generate new vectors for embedding within the AI model 120 (function 315). That is, the newly-received information can be converted to numerical representations that are compatible with the AI model 116 so that future searches can be made more intelligent. While FIG. 3 shows vector generation function 315 as happening in-line with data collection and storage, other embodiments could perform vector generation 315 at a later time based upon information stored in database 102 or the like. Vector generation may be performed when processing resources are otherwise underutilized, for example, or on any regular (or irregular) temporal basis. New vectors could be generated daily, weekly, monthly or otherwise, for example, based upon the new data that has been added since the last vector generation. Additional detail about automated generation of embedded vectors is described below.

Received and processed data may be inserted into the schema for storage in database 102 in any manner. That is, any query results can be placed in the metadata schema associated with the media program, and the record is stored in database 102 for subsequent retrieval (function 316). Similarly, any embedded vector data may be stored in database 102, or in another database associated with AI model 116, as appropriate.

The process of identifying missing metadata and querying for additional or updated information continues until the record is complete, if desired, or until all available information has been exhausted (function 318). Again, the database may be updated and/or validated in real time in response to user queries, if desired, or in a batch manner (e.g., daily, weekly, monthly, etc), or in an aperiodic matter if desired so that multiple program records are processed in the same session.

Figure 4:
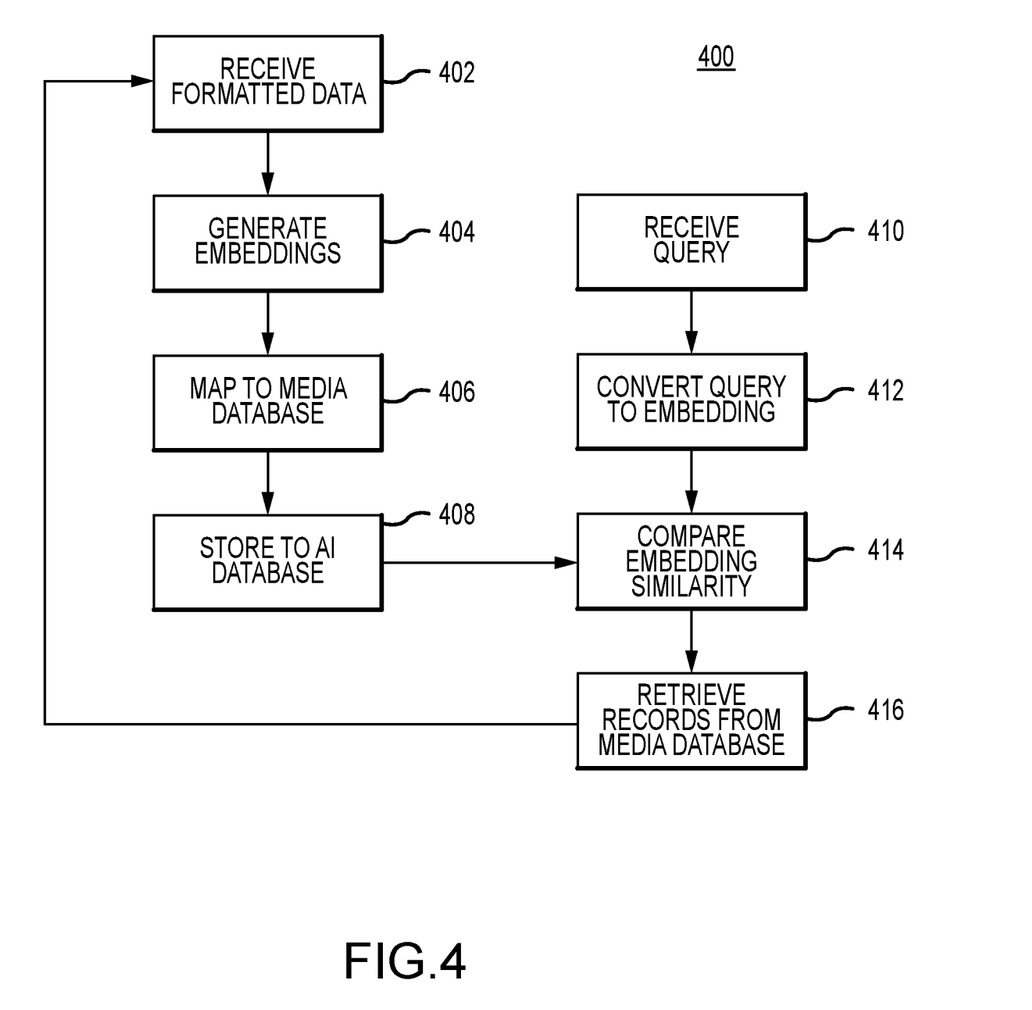
FIG. 4 illustrates an example of an automated process to generate embedded vectors relating to media programs for subsequent use by an artificial intelligence (AI) engine.

As noted above, collected program data may be used to generate and/or update embedded vectors of the model 116 in any manner. FIG. 4 illustrates an example of an automated process 400 to create vector embeddings for a database that can be used to implement semantic search capabilities related to media program metadata.

With reference now to FIG. 4, an automated process 400 performed by a mapping service 110 or the like suitably includes receiving formatted data (function 402), generating vector embeddings based upon the received data (function 404), indexing or mapping the generated vectors to reference the information in media database 102 (function 406), and storing the indexed vectors to the AI engine for further processing (function 408). When subsequent queries are received (function 410), the query could be converted (e.g., using natural language processing 118 or the like) to similar vector syntax (function 414) that can then be compared to the vectors embedded in the AI model 120 (function 414). Matches can permit media records to be retrieved from the database 102, as desired, for delivery to the user. Any feedback data (e.g., viewer feedback, subsequent queries, etc.) can be used to further refine the embedded vectors, thereby improving the AI model (function 420).

As noted above, metadata about one or more media programs may be received in any manner (function 402). Function 314 above describes one example of a technique wherein obtained data is properly formatted in accordance with a predetermined schema for storage in database 102. If desired, function 402 could further involve performing further data modifications, such as removal of special characters, translation from other languages, localizing content for one or more geographic regions, standardizing formats and/or performing other normalization functions as desired.

Embedded vectors may be generated in any manner. In various embodiments, the vectors will be generated to be compatible with one or more pre-trained AI engines such as Bidirectional Encoder Representations from Transformers (BERT) developed by Google, Generative Pre-trained Transformer (GPT) developed by OpenAI, LLAMA developed by Meta, and/or any other engine as desired, including any engine(s) that are subsequently developed. The AI engine will typically convert the textual data from the program database 102 (e.g., program descriptions, reviews, plot summaries and/or the like) to vector embeddings that represent each piece of text with a numerical set of values in a high-dimensional space. These vectors therefore numerically represent the underlying text according to an algorithm or technique that is associated with the particular AI model 120. In some implementations, an approximate nearest neighbor (ANN) algorithm is used to generate the values of the various vector components, although other algorithms could be used in other embodiments.

Generated vector embeddings can be indexed in any manner (function 406) and stored for further processing (function 408). Generally speaking, it will be desirable to maintain an index of links between each embedded vector and its corresponding data in media database 102 to permit subsequent reference and retrieval. Indexes may be maintained as part of a data structure in the AI database that contains a pointer (e.g., a URL or the like) to the corresponding data in database 102. Other embodiments may include resources in database 102 to permit embedded vectors and media content to be stored in the same database, if desired. Still other embodiments may make use of cloud-based databases that share links or other connections between AI vectors and associated data in shared or partitioned data space, as appropriate.

Generally speaking, generated embeddings are stored in a manner that is efficient for search functions to permit efficient retrieval at a later time. Often, specialized tools such as Elasticsearch with Vector Plugins (available from Elastic NV), FAISS search tools available from Meta, MILVUS vector search available form ZILLIZ, and/or many others could be used to organize and store the embedded vectors. Such products are typically optimized for vector search, and can greatly reduce search times when processing subsequent queries.

As noted above, embedded vectors may be generated and stored according to any time schedule. Vectors may be generated or updated in real time as the program database is updated, if desired. Alternatively, it may be more computationally efficient to perform regular (or irregular) updates on some or all of the database at times when processing resources are available, and/or when multiple database records can be processed in bulk. Other vector generation routines may be initiated by a human operator, if desired, or otherwise on an as-needed basis.

The AI engine 120 suitably uses the embedded vectors to process queries, which are often received in natural language (function 410). Queries may relate to queries received from end users, if desired, or from automated agents seeking to update the database as appropriate.

When a query is received, it is converted to a similar embedded vector using similar model(s) previously applied to the underlying data (function 412). That is, the model converts the natural language or other query information into a multi-variable numeric vector that can be compared to the vectors previously stored in the AI database (function 414). Any comparison technique could be used, such as cosine similarity analysis or the like. In this example, the model mathematically determines the angle between the vector of the query and the vector of the previously-stored vectors representing the data. Generally speaking, most algorithms are more interested in finding vectors that point in the same direction than in finding vectors of similar magnitude, although other factors could be considered as well. Cosine similarity conventionally provides a number between −1 and 1 that can indicate the spatial distance between the two vectors so that embedded database vectors having the smallest difference to the query vector can be identified and isolated. The identified vectors can be dereferenced to their underlying data to provide information relevant to the search.

Media records can thereby be identified from a query based upon the closest embeddings, as identified through numerical analysis. These records can be retrieved from database 120 or the like (function 416) and delivered for further processing as desired. Retrieved information may be formatted, for example, using natural language (e.g., by natural language framework 118 or the like). Alternatively, retrieved information may be formatted (using, e.g., Python or other code) for storage as part of a record stored in database 102, as appropriate. Further processing may include delivery of program data to a customer or administrator, updates made to database 120, and/or any other processing as desired.

In various embodiments, the retrieval process can be improved though the use of intelligent feedback 420. Feedback could be in the form of subsequent queries that are received after initial data is provided, for example. Feedback could be solicited, if desired, or simply observed and processed as it naturally occurs. If the feedback indicates displeasure or ambiguity with the results, for example, then new vectors could be generated for subsequent use, thereby improving the overall performance and accuracy of AI model 120.

The various functions shown in FIGS. 2-4 may be implemented in any number of different ways. In various embodiments, one or more processors associated with system 100 (e.g., processor 120) execute software, firmware or other programmed logic to perform the various functions shown. Software may be stored in any sort of solid state, magnetic, optical or other non-transitory digital storage, such as storage 121, although other embodiments may distribute the data storage and processing functions amongst the various components of system 100 in any number of other ways. Further, some of all of the functionality illustrated in FIGS. 2-4 could be equivalently performed using cloud resources (e.g., Amazon AWS resources) if desired.

Benefits, other advantages, and solutions to problems have been described herein with regard to specific embodiments. Furthermore, the connecting lines shown in the various figures contained herein are intended to represent exemplary functional relationships or couplings between the various elements. It should be noted that many alternative or additional functional relationships or connections may be present in a practical system. However, the benefits, advantages, solutions to problems, and any elements that may cause any benefit, advantage, or solution to occur or become more pronounced are not to be construed as critical, required, or essential features or elements of the inventions.

The scope of the invention is accordingly to be limited by nothing other than the appended claims, in which reference to an element in the singular is not intended to mean "one and only one" unless explicitly so stated, but rather "one or more." Moreover, where a phrase similar to "A, B, or C" is used herein, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or device that comprises a list of elements does not include only those elements but may include other elements not expressly listed or inherent to such process, method, article, or device.

The term "exemplary" is used herein to represent one example, instance, or illustration that may have any number of alternates. Any implementation described herein as "exemplary" should not necessarily be construed as preferred or advantageous over other implementations. While several exemplary embodiments have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of the various features described herein without departing from the scope of the claims and their legal equivalents.

What is claimed is:

1. An automated process performed by a computer system to automatically update information in a database of media program information that is stored on a non-transitory digital storage, the automated process comprising:
   identifying, by querying the database of media programs by a first processor of the computer system, one or more missing data fields in metadata about a particular media program that is stored in the database;
   automatically formatting, by the first processor of the computer system, a query related to the one or more missing data fields to obtain additional information about the media program from an artificial intelligence (AI) engine executing on a second processor of the computer system, wherein the AI engine comprises embedded vectors representing data previously obtained about the particular media program;
   forwarding the query from the first processor to the second processor;
   in response to the query, the second processor identifying additional information corresponding to the one or more missing data fields based upon the embedded vectors, wherein the identifying comprises the second processor converting the query from a natural language format to one or more query vectors and comparing the query vectors to the embedded vectors by the second processor to identify one or more embedded vectors that are most relevant to the query vectors;
   providing, by the AI engine, the data previously obtained about the particular media program to the first processor in response to the query;
   updating, by the first processor, the missing data fields in the metadata stored in the database about the particular media program with the additional information data received from the AI engine; and
   subsequently providing the updated metadata about the particular media program from the database for publication in an electronic program guide.

2. The automated process of claim 1 wherein the identifying further comprises obtaining the additional information based upon the embedded vectors that are most relevant to the query vectors.

3. The automated process of claim 2 wherein the formatting comprises formatting the query in the natural language format by the computer system.

4. The automated process of claim 1 further comprising receiving information about the media program and processing the received information by the AI engine to thereby generate the embedded vectors.

5. The automated process of claim 1 further comprising validating the metadata about the media program by checking the additional information against another source of data.

6. The automated process of claim 5 further comprising placing a subsequent query to the AI engine if the additional information does not match information received from the other source of data.

7. The automated process of claim 1 wherein the metadata about the media program is formatted according to a schema for storage in the database.

8. The automated process of claim 1 further comprising publishing the stored metadata to an electronic program guide service.

9. The automated process of claim 1 wherein the AI engine is a large language model (LLM) executed by the processor of the computer system.

10. A computer system comprising a first processor and a second processor, a non-transitory digital storage and an interface to a network, wherein the non-transitory digital storage comprises computer-executable instructions stored thereon that, when executed by the processors, perform an automated process comprising:
    identifying, by querying the database of media programs by the first processor of the computer system, one or more missing data fields in metadata about a particular media program that is stored in the database;
    automatically formatting, by the first processor of the computer system, a query related to the one or more missing data fields to obtain additional information about the media program from an artificial intelligence (AI) engine executing on the second processor of the computer system, wherein the AI engine comprises embedded vectors representing data previously obtained about the particular media program;
    forwarding the query from the first processor to the second processor;
    in response to the query, the second processor identifying additional information corresponding to the one or more missing data fields based upon the embedded vectors, wherein the identifying comprises the second processor converting the query from a natural language format to one or more query vectors and comparing the query vectors to the embedded vectors by the second processor to identify one or more embedded vectors that are most relevant to the query vectors;

providing, by the AI engine, the data previously obtained about the particular media program to the first processor in response to the query;

updating, by the first processor, the missing data fields in the metadata stored in the database about the particular media program with the data received from the AI engine; and subsequently providing the updated metadata about the particular media program from the database for publication in an electronic program guide.

11. The computer system of claim 10 wherein the identifying further comprises obtaining the additional information based upon the embedded vectors that are most relevant to the query vectors.

12. The computer system of claim 11 wherein the formatting comprises formatting the query in the natural language format by the computer system.

13. The computer system of claim 10 further comprising receiving information about the media program and processing the received information by the AI engine to thereby generate the embedded vectors.

14. The computer system of claim 10 wherein the metadata about the media program is formatted according to a schema for storage in the database.

15. The computer system of claim 10 wherein the automated process further comprises publishing the stored metadata to an electronic program guide service.

* * * * *